US012125339B2

(12) United States Patent
Davis et al.

(10) Patent No.: US 12,125,339 B2
(45) Date of Patent: Oct. 22, 2024

(54) SYSTEMS AND METHODS FOR INDEPENDENT CONTROL OF PORTIONS OF A DISPLAY IN AN ELECTRONIC GAME

(71) Applicant: Aristocrat Technologies, Inc., Las Vegas, NV (US)

(72) Inventors: Blake Davis, Las Vegas, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 324 days.

(21) Appl. No.: 17/834,786

(22) Filed: Jun. 7, 2022

(65) Prior Publication Data

US 2023/0394911 A1 Dec. 7, 2023

(51) Int. Cl.
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
CPC ... G07F 17/3213; G07F 17/34; G07F 17/3267
USPC ........................................................ 463/20
See application file for complete search history.

(56) References Cited

U.S. PATENT DOCUMENTS 8,591,312 B2 11/2013 Roukis
8,747,205 B2 6/2014 Englman
10,867,483 B1 12/2020 Penacho
2014/0235338 A1* 8/2014 Hansson .............. A63F 13/533 463/31
2015/0287287 A1* 10/2015 Itagaki ................. G07F 17/323 463/20
2016/0093148 A1* 3/2016 Hawkins ............ G07F 17/3227 463/20
2017/0061743 A1* 3/2017 Itagaki .................... G07F 17/34
2022/0375306 A1* 11/2022 Slomiany ........... G07F 17/3267
2023/0054680 A1* 2/2023 Sahl ................... G07F 17/3213

* cited by examiner

*Primary Examiner* — Pierre E Elisca
(74) *Attorney, Agent, or Firm* — Aristocrat Technologies, Inc.

(57) ABSTRACT

A system is provided. The system may include a display device and a processor configured to present an array of display positions including columns and rows of display positions, the array including a first row having a reel of symbols associated with each column of the first row for displaying symbols on the reels within the first row, the array including a second row for displaying a set of initial symbols, each row of the array above the first row including a progressively increasing multiplier value, identify an RNG output for each of the reels, perform a lookup within a table associated with a column using the RNG output for the column, determine that a step-up symbol should be displayed in the first column based on the first lookup, and move the initial symbol displayed in the first column up at least one row based on the determination.

20 Claims, 11 Drawing Sheets

SYSTEMS AND METHODS FOR INDEPENDENT CONTROL OF PORTIONS OF A DISPLAY IN AN ELECTRONIC GAME

TECHNICAL FIELD

The field of disclosure relates generally to electronic gaming, and more particularly to systems and methods for independent control of displaying symbols within respective columns of an array of display positions in an electronic game.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a system for independently controlling portions of a game display is provided. The system may include a display device and a processor. The processor may be configured to execute instructions stored in a memory device, which when executed, cause the processor to control the display device to present an array of display positions including columns and rows of display positions, the array including a first row having a reel of symbols associated with each column of the first row for displaying symbols on the reels within the first row, the array including a second row for displaying a set of initial symbols, each row of the array above the first row including a progressively increasing multiplier value, identify an RNG output for each of the reels, perform a first lookup within a first table associated with a first column using the RNG output for the first column, determine that a step-up symbol should be displayed in the first column based on the first lookup, move the initial symbol displayed in the first column up at least one row based on the determination that the step-up symbol should be displayed, and/or credit an award to a player credit balance, the award computed based the multiplier values of the rows in which the initial symbols are currently displayed.

In another aspect, a method for independently controlling portions of a game display is provided. The method may include providing content configured to cause a display device to present an array of display positions including columns and rows of display positions, the array including a first row having a reel of symbols associated with each column of the first row for displaying symbols on the reels within the first row, the array including a second row for displaying a set of initial symbols, each row of the array above the first row including a progressively increasing multiplier value, generating an RNG output for each of the reels, performing a first lookup within a first table associated with a first column using the RNG output for the first column, determining that a step-up symbol should be displayed in the first column based on the first lookup, providing instructions configured to cause the display device to move the initial symbol displayed in the first column up at least one row based on the determination that the step-up symbol should be displayed, and/or crediting an award to a player credit balance, the award computed based the multiplier values of the rows in which the initial symbols are currently displayed.

In another aspect, at least one non-transitory computer-readable media having computer-executable instructions embodied thereon is provide. When executed by a processor, the computer-executable instructions may cause the processor to provide content configured to cause a display device to present an array of display positions including columns and rows of display positions, the array including a first row having a reel of symbols associated with each column of the first row for displaying symbols on the reels within the first row, the array including a second row for displaying a set of initial symbols, each row of the array above the first row including a progressively increasing multiplier value, retrieve an RNG output for each of the reels, perform a first lookup within a first table associated with a first column using the RNG output for the first column, determine that a step-up symbol should be displayed in the first column based on the first lookup, provide instructions configured to cause the display device to move the initial symbol displayed in the first column up at least one row based on the determination that the step-up symbol should be displayed, and/or credit an award to a player credit balance, the award computed based the multiplier values of the rows in which the initial symbols are currently displayed.

DETAILED DESCRIPTION

Figure 1:
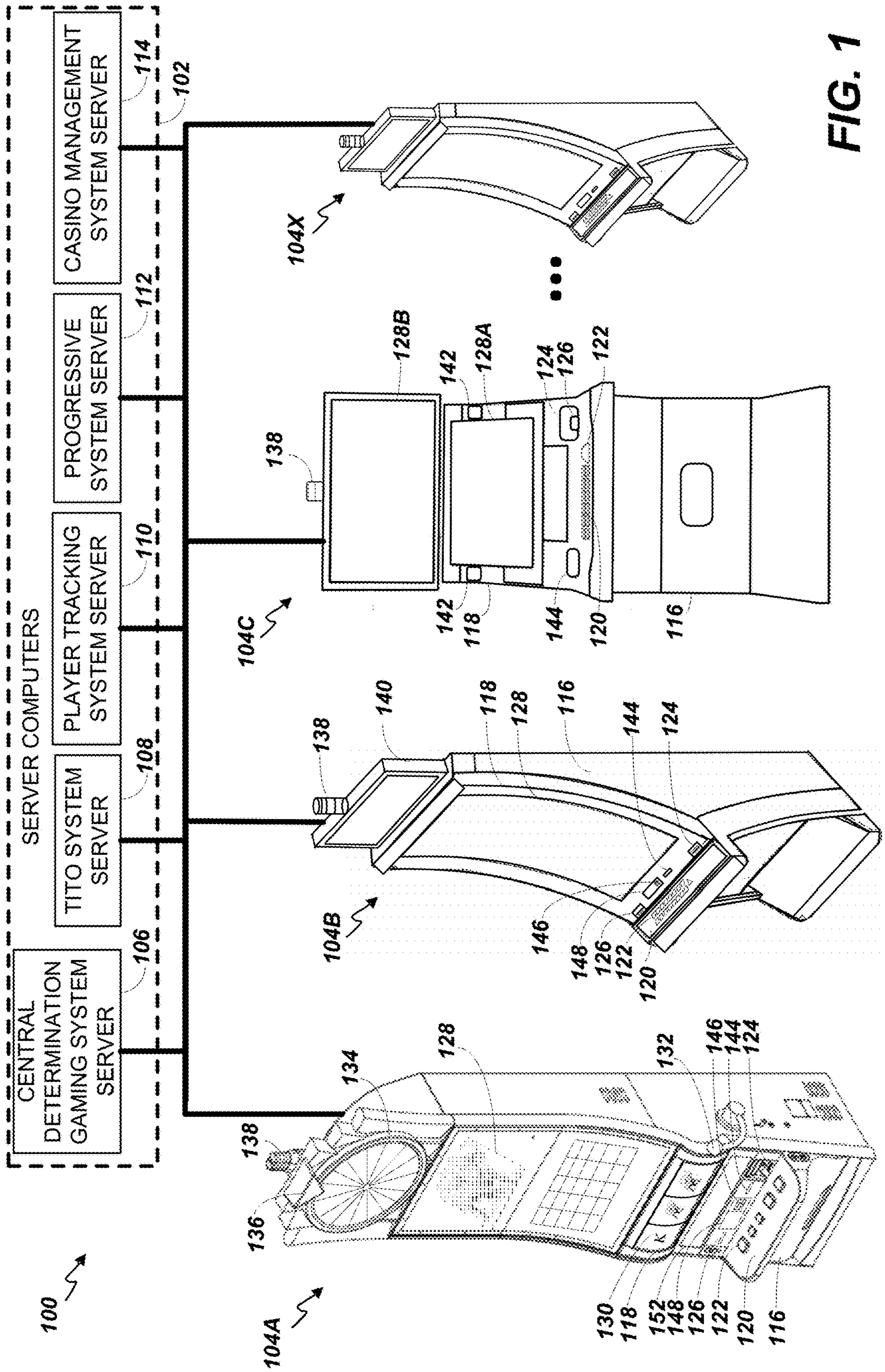
FIG. 1 is an exemplary diagram showing several EGMs networked with various gaming related servers.

The systems and methods described herein include independently controlling portions of a display in an electronic game, particularly, a location of symbols within positions in columns of an array of symbol positions, based on a separate RNG output and a separate lookup table associated with each column of the array. The systems and methods further include, in response to one of the separate RNG outputs, randomly displaying a step-up symbol within a display position within the array that causes one or more symbols in a respective column to move up a row within the array of display positions, wherein each row has a progressively increasing multiplier associated with the row. The systems and methods further include, in response to an RNG output associated with one of the columns of the array in which each row has a multiplier value displayed, randomly displaying a boost symbol, wherein the multiplier values are increased when the boost symbol is displayed. The systems and methods further include dynamically modifying a reel associated with each column of the array when a certain symbol is displayed by removing the displayed symbol from the set of symbols to be displayed on subsequent spins of the reel during the feature game by modifying the lookup table associated with the reel.

As described in further detail below, the system may provide a game operator several degrees of freedom that are not available in existing electronic gaming systems to achieve a desired RTP while still meeting regulatory requirements and providing an engaging game to users. At least some other technical improvements that are achieved by the systems and processes described herein include the ability to independently control the display of symbols included within each column of the array by using a separate RNG output and associated lookup table for each column of the array. In addition, the systems and methods described herein utilize a number of step-up symbols that matches the number of rows included within the array of display positions and removes the step-up symbol each time a step-up symbol is displayed from the set of symbols that can be displayed so that a step-up symbol cannot be displayed in a column of the array when the active symbol in that column being displayed has reached the top row. Furthermore, the systems and methods described herein include the ability to control the multipliers displayed in one column of the array by using an additional RNG output to randomly boost the multipliers during game play. These technical benefits include improved variability in game play, improved and unique display features, and improved and unique data storage and processing capabilities through the use of additional RNG outputs for each column in the array along with corresponding lookup tables for each column that also control the number of step-up symbols that can be displayed during game play within each column based upon the number of step-up symbols that have already been displayed.

In example embodiments, the system may be configured to display one or more "ladders" and one or more reels (e.g., a s single-row of slot reels), each of which may be associated with one of the ladders. As described in further detail below, slot reels and their corresponding ladders may each be controlled independently using separate RNGs and lookup tables. Each of the ladders may include one or more segments (referred to herein as "ladder positions") arranged linearly (e.g., from a bottom end of the ladder to a top end of the ladder), so that the ladders together form a portion of an array. Each of the ladder positions may be associated with a certain value, such as a multiplier value. These values may progressively increase from one end of the ladder (e.g., the bottom) to the other end (e.g., the top). Symbols (referred to herein as "ladder symbols") may be displayed in the ladder positions. For example, upon initialization, the ladder symbols may be displayed in the bottommost ladder position corresponding to the smallest multiplier. The ladder symbols may each include a value, which along with the multipliers may be used to determine a prize to award upon completion (e.g., when no spin credits remain). In response to game instances, or "spins," different symbols may be displayed by the reels. The particular symbol displayed by each reel may be determined based on a separate lookup table corresponding to each reel and a separate RNG call performed for each reel. When certain symbols (sometimes referred to herein as "step-up symbols" or "ladder incrementing symbols," are displayed, the ladder symbols may be incremented to the next ladder position (e.g., corresponding to a greater multiplier value) along the ladder, which will result in a greater prize award.

Additional types of symbols, each having different effects, may be displayed in response to a game instance. In some embodiments, certain symbols (referred to herein as "multiplier enhancing symbols" or "boost symbols") may result in an increase of the multiplier values. Accordingly, the ladders may be "two-dimensional," in that a greater award may be achieved both by incrementing the ladder symbol along the ladder or by increasing the multiplier values corresponding to each respective ladder position. Further additional symbols may have the effects of, for example, adding additional spin credits so that more feature game spins may be performed, increasing the values associated with the ladder symbols, and/or adding additional ladder symbols (e.g., so that a ladder may include multiple ladder symbols displayed in different respective ladder positions). These aspects may enable a game operator several degrees of freedom to achieve a desired RTP while still meeting regulatory requirements and providing an engaging game to users.

Further, in some embodiments, each reel may include a different lookup table, so that the probability of certain symbols appearing in each reel may be adjusted. In some embodiments, when a certain symbol is displayed, the symbol may be "removed" from the reel. In other words, the lookup table associated with the reel may be dynamically updated (e.g., by adjusting which possible RNG call outcomes are associated with displaying which particular symbols) to reduce a probability that the symbol will be displayed in future spins. For example, each reel may initially include seven ladder incrementing symbols, each having associated RNG call outcomes. Each time one of the symbols is displayed, the lookup table may be updated so that the previous RNG call outcome is no longer associated with the ladder incrementing symbols (e.g., a blank space may be displayed if the same RNG call outcome occurs again). Accordingly, each time a ladder incrementing symbol is displayed, a probability of a ladder incrementing symbol is reduced, and once each of the seven ladder incrementing symbols has been displayed, there is no longer a chance of further ladder incrementing symbols being displayed. Other types of symbols may be removed and/or replaced similarly. As a result, as compared to traditional lookup or pay tables, the lookup tables of the system provide gaming operators with additional degrees of freedom to limit and/or achieve a desired RTP and/or meet regulatory requirements limiting RTP while still providing engagement to users.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
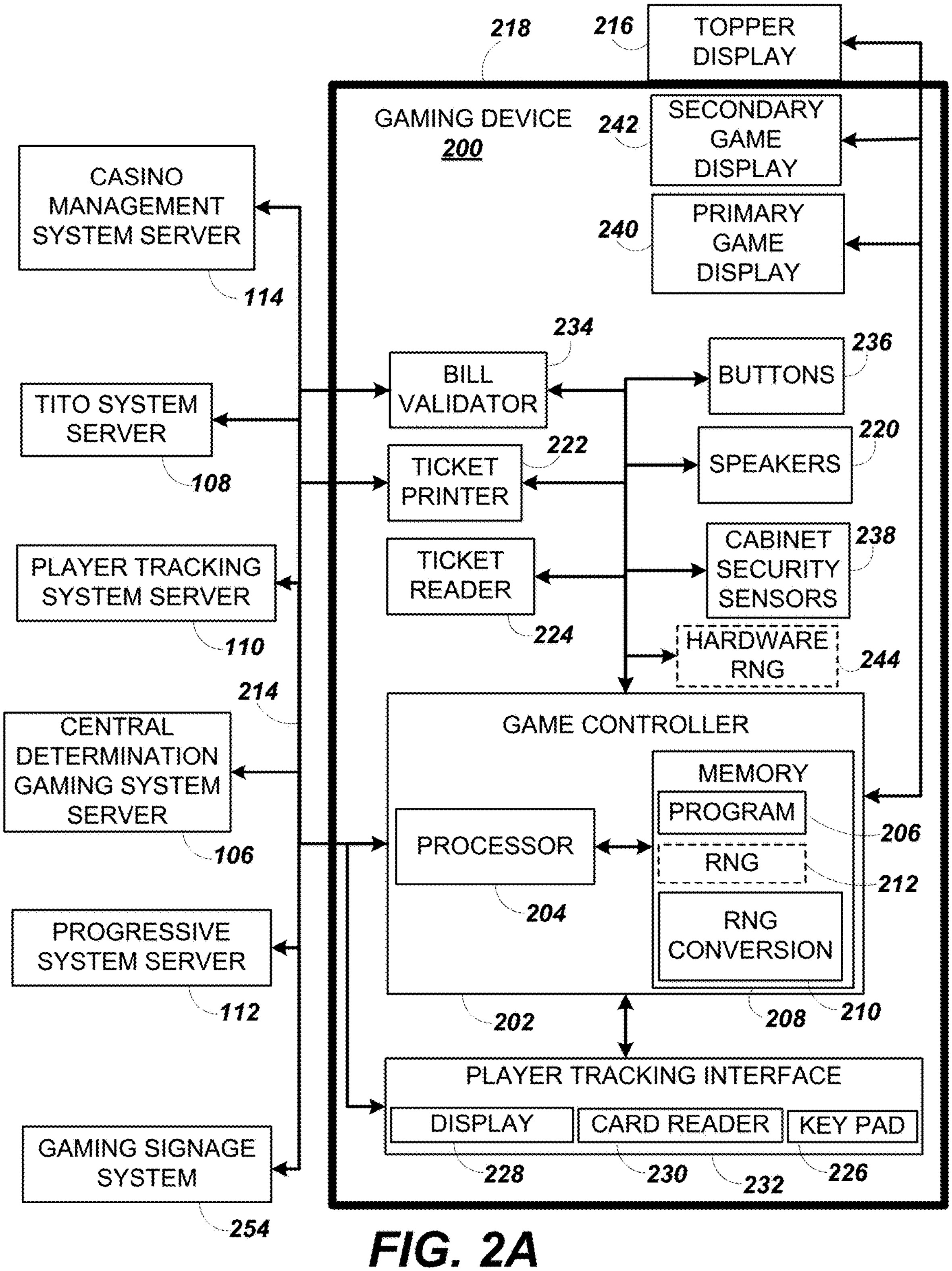
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
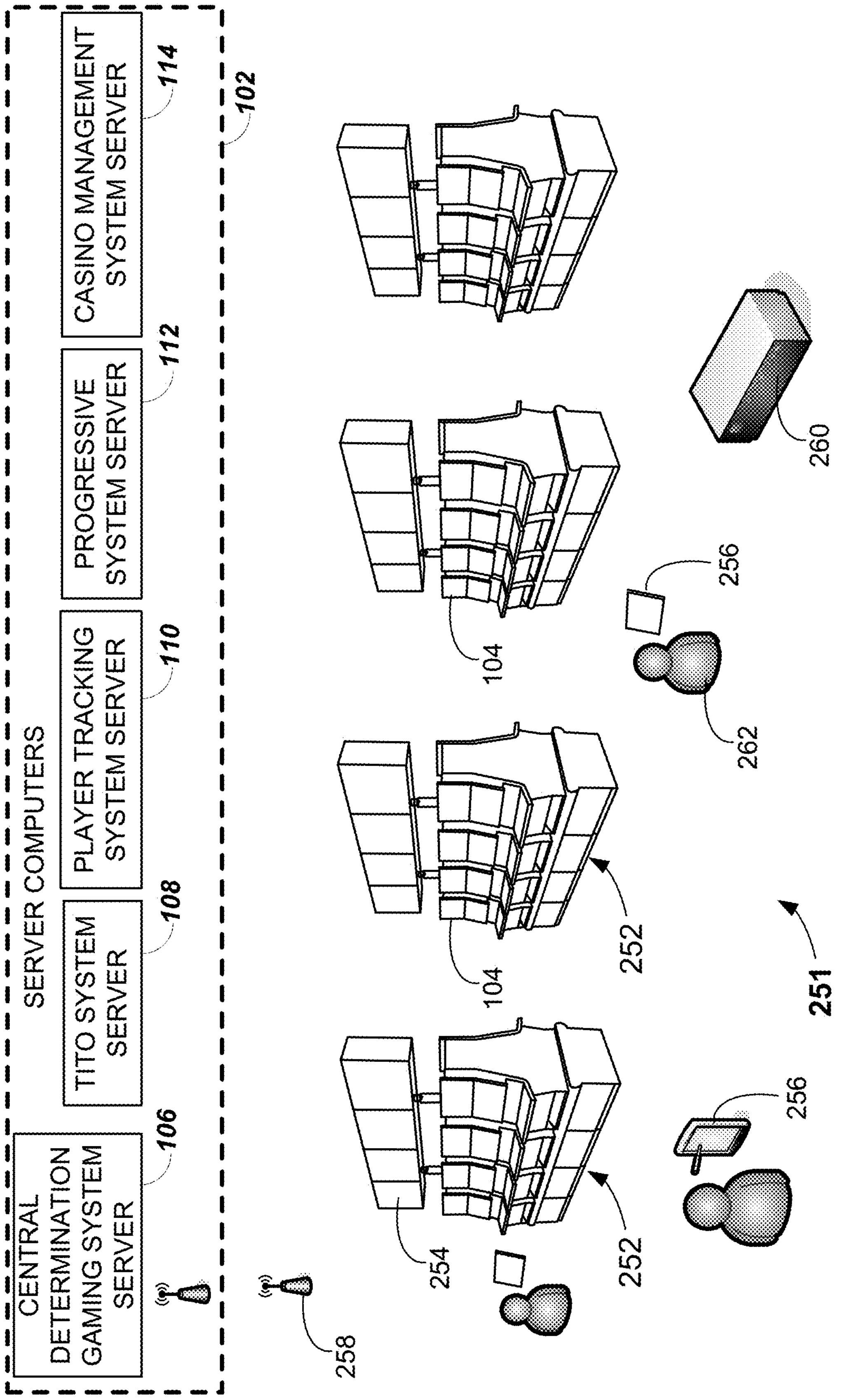
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
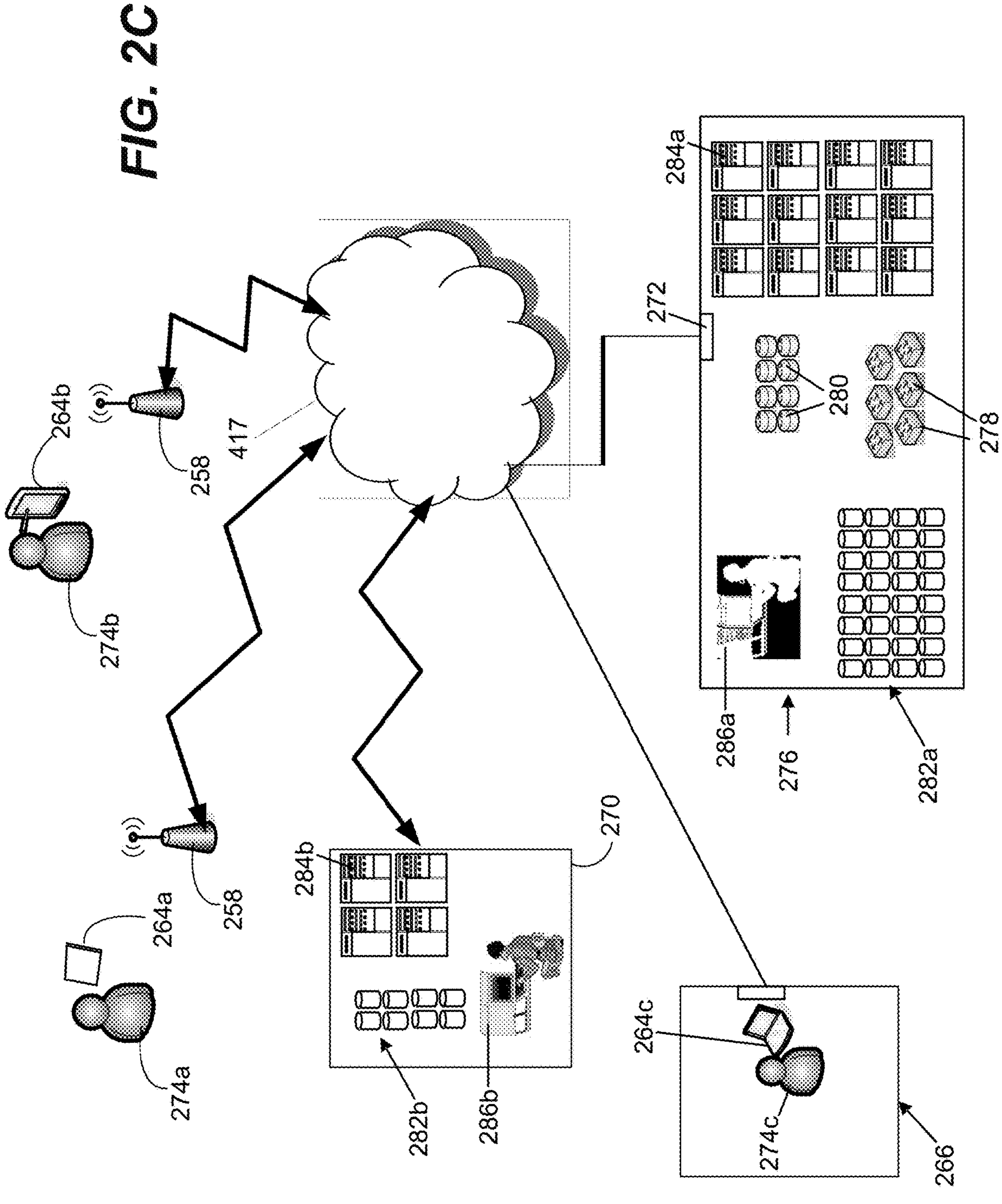
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server

284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
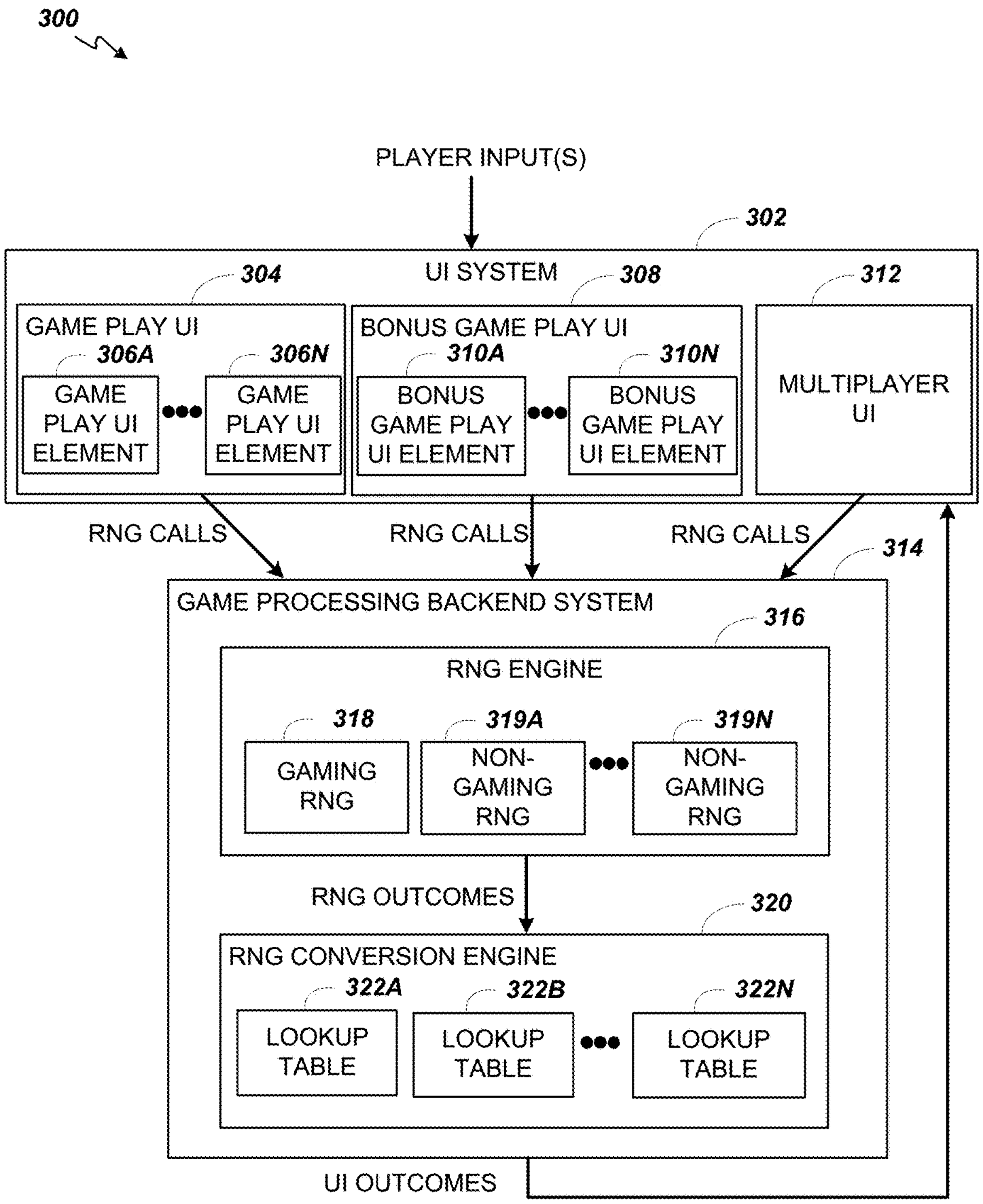
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multi-player UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

In the example embodiment, and as used herein, terms and phrases such as "progressive jackpot," "progressive jackpot award," and/or simply "progressive" may refer to an award that is generated or funded from a plurality of networked gaming devices 104A-104X. For example, as described herein, a progressive jackpot may be increased based upon wagers occurring on one or more gaming devices 104A-104X, such as those networked in a "bank" or collection of such devices on a casino floor.

In some embodiments, local-area progressive jackpots may be implemented, which may receive contributions from only a small number of gaming devices 104A-104X, such as those located in a given physical space or area, such as within a bank or other collection of gaming devices 104A-104X. Although local-area progressives are generally described herein, in some implementations, so-called wide-area progressive jackpots may be implemented, which may receive contributions from gaming devices 104A-104X at any location within a given casino and/or, in some embodiments, from gaming devices 104A-104X at different casinos.

Moreover, in some embodiments, a plurality of progressive jackpots may be provided, and one or more jackpots may be variously funded, such as at different rates and/or in different amounts in response to player wagers, and the like. It will also be appreciated that a plurality of progressive jackpots may be organized in one or more tiers and/or otherwise hierarchically, such as from a smallest progressive to a largest progressive, from a largest progressive jackpot to a smallest progressive jackpot, and the like.

In at least some embodiments, a progressive jackpot award may increase from a base value, which may be preset, to any value greater than the base value. In some embodiments, a progressive jackpot award may increase from the base value in increments, such as in increments of fractions of a cent, cents, fractions of a dollar, dollars, and the like. In various embodiments, jackpot increments may be based, at least in part, on player wager values. For example, as one or more players place larger wager amounts during a base and/or bonus game, one or more progressive jackpots may be increased or funded in larger increments and/or, as described in greater detail herein, in more rapidly accumulating increments.

Figure 4A:
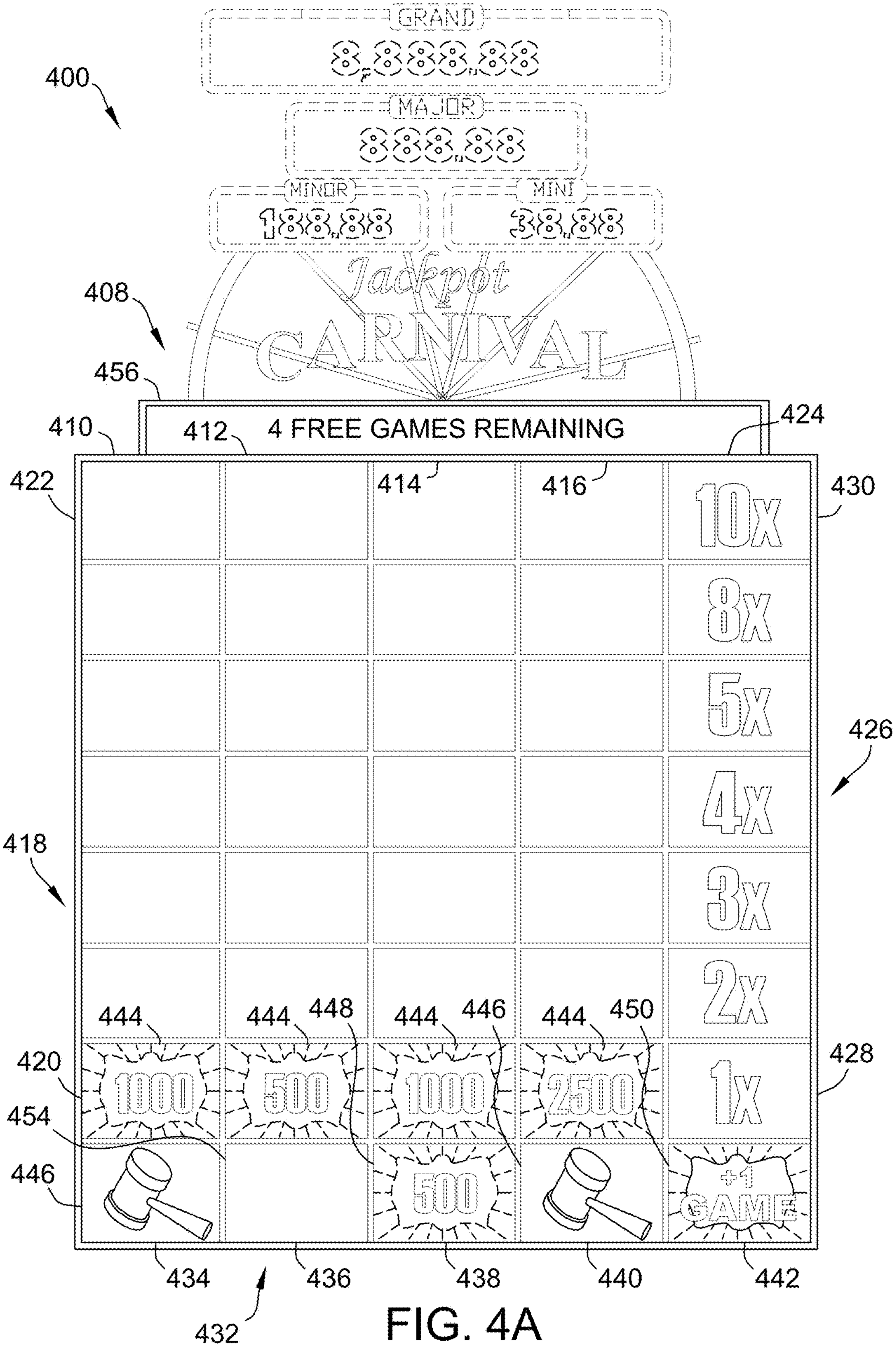
FIG. 4A is an example user interface of an example game feature having a two-dimensional multiplier ladder feature according to an embodiment of the present disclosure.

FIGS. 4A, 4B, 4C, and 4D are user interfaces 400, 402, 404, and 406 of an example embodiment of a display having independently-controlled portions, which may be displayed, for example, by main display 128 of gaming device 104, mobile gaming device 256, and/or another gaming device. Referring to FIG. 4A, in the example embodiment, the interface may include a plurality of ladders 408, including a first ladder 410 a second ladder 412, a third ladder 414, and a fourth ladder 416. Although four ladders 408 are shown and described, it will be appreciated that any suitable number of ladders may be implemented. Each ladder 408 includes a plurality of ladder positions 418, including a first ladder position 420 at a first (e.g., bottom) end of each ladder 408 and a top ladder position 422 and a second (e.g., top) end of each ladder 408. There may be additional ladder positions 418 between first ladder position 420 and top ladder position 422. Although in the example embodiment each ladder 408 has seven ladder positions 418, it will be appreciated that any suitable number of ladder positions may be implemented. As described in further detail below, certain symbols may be displayed in ladder positions 418.

In the example embodiment, the interface may further include a multiplier ladder 424 including a plurality of multiplier ladder positions 426. Multiplier ladder may be disposed adjacent to ladders 408 (e.g., adjacent to fourth ladder 416), and each of the multiplier ladder positions 426 may correspond to ladder positions 418 in a respective row. For example, a first multiplier ladder position 428 of the multiplier ladder positions 426 may correspond to first ladder positions 420, and a top multiplier ladder position 430 may correspond to top ladder positions 422. As described in further detail below, a value (e.g., a multiplier) may be displayed in each multiplier ladder positions 426. The values may progressively increase from first multiplier ladder position 428 to top multiplier ladder position 430. In other words, first multiplier ladder position 428 may have a lesser value (e.g., a 1× multiplier) and top multiplier ladder position 430 may have a greater value (e.g., a 10× multiplier), with progressively increasing values (e.g., a 2× multiplier, 3× multiplier, 4× multiplier, 5× multiplier, and an 8× multiplier) therebetween. In some alternative embodiments, rather than multiplier values, the different ladder positions 418 may correspond to different prizes, jackpots, and/or other awards.

In the example embodiment, the interface may further include a plurality of reels 432, each of which align with and correspond to a respective ladder 408 or multiplier ladder 424. For example, a first reel 434 may correspond to first ladder 410, a second reel 436 may correspond to second ladder 412, a third reel 438 may correspond to third ladder 414, a fourth reel 440 may correspond to fourth ladder 416, and a fifth reel 442 may correspond to multiplier ladder 424. As described in further detail below, each reel 432 may display one of a set of symbols. Although each reel 432 is shown and described as including a single position in which such symbols may be displayed, it will be appreciated that any number of symbols may be displayed by each reel 432. For example, each reel 432 may include multiple symbol positions, such that the reels 432 together form an array of symbol positions.

As shown in FIG. 4A, upon initialization, a ladder symbol 444 is displayed in first ladder position 420 of each ladder 408. In the example embodiment, each ladder symbol includes a certain credit value (e.g., 500, 1000, and/or 2000) (sometimes referred to herein as a "ladder symbol value"). The value displayed for each ladder symbol may depend on an outcome of a base game and/or may be randomly selected (e.g., based on an RNG outcome). For example, in some embodiments, the base game may include a component in which certain values may be displayed on corresponding reels in the base game, and the ladder symbol values may be set based on these values. As described in further detail below, a position of each ladder symbol 444 may change (e.g., the ladder symbol 444 may be displayed in a different position in response to certain symbols being displayed). For example, a ladder symbol 444 may move to a higher ladder position 418. A current position of each ladder symbol 444 may be recorded (e.g., as a pointer) in the memory (e.g., memory 208). Further, when the game is initialized, a number of spin credits may be determined and recorded in the memory. The spin credits may be decremented in response to each game instance (or "spin"), and an award may be determined when no spin credits remain. In some embodiments, the initial number of spin credits may be a set amount (e.g., five credits), and/or may be determined based on other factors (e.g., an RNG call and/or an outcome of a base game).

In response to a game instance (or "spin"), one or more symbols may be displayed by reels 432. These symbols may include, for example, ladder incrementing (or "step-up") symbols 446 (shown in FIGS. 4A and 4C as a hammer symbol), credit symbols 448 (shown in FIGS. 4A and 4C), spin credit symbols 450 (shown in FIG. 4A), multiplier enhancing symbols 452 (shown in FIG. 4C as a "boost" symbol), and/or blank spaces 454 (shown in FIGS. 4A and 4C), the specific functions of which are described in further detail below. To determine whether to display a symbol, and which symbol to display, on each reel 432, a separate RNG call may be performed (e.g., using RNG 212) for each reel 432 (e.g. by gaming device 104 and/or gaming system server 106). A number generated by the RNG call may be compared (e.g. by gaming device 104 and/or gaming system server 106) to a respective lookup table stored in the memory to determine a reel outcome (e.g., which, if any, symbols to display). A different lookup table may be stored for each reel 432, and may include a plurality of possible RNG call outcomes (e.g. numbers) and a symbol or blank space 454 associated with each possible outcome. In some embodiments, the determination is weighted, in that certain outcomes are more likely than others (e.g., because certain outcomes have more associated numbers in the lookup table). For example, it may be more likely that blank space 454 is displayed than a space containing a symbol.

Figure 4B:
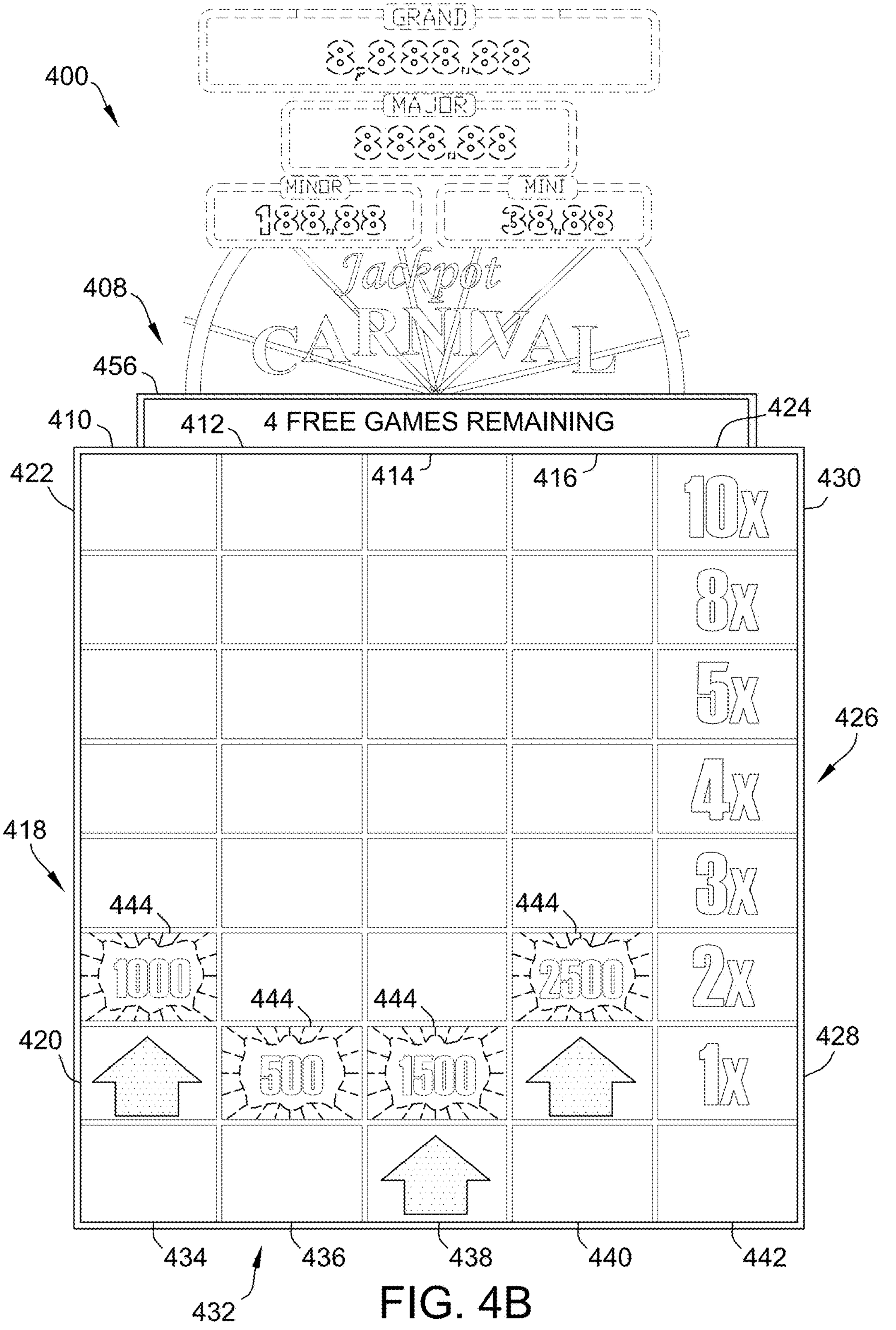
FIG. 4B is another example user interface of the game feature shown in FIG. 4A.
Figure 4C:
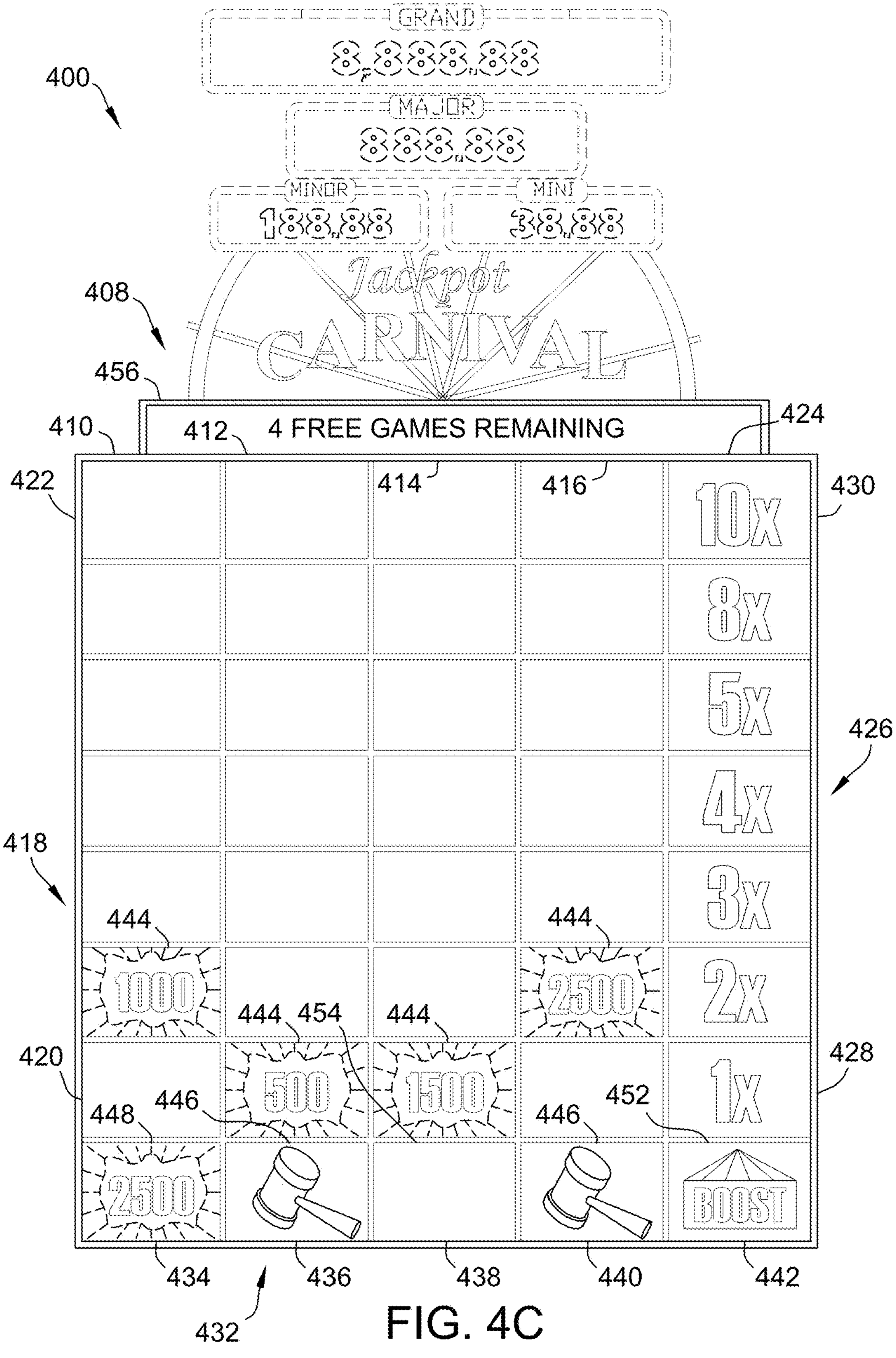
FIG. 4C is another example user interface of the game feature shown in FIGS. 4A and 4B.
Figure 4D:
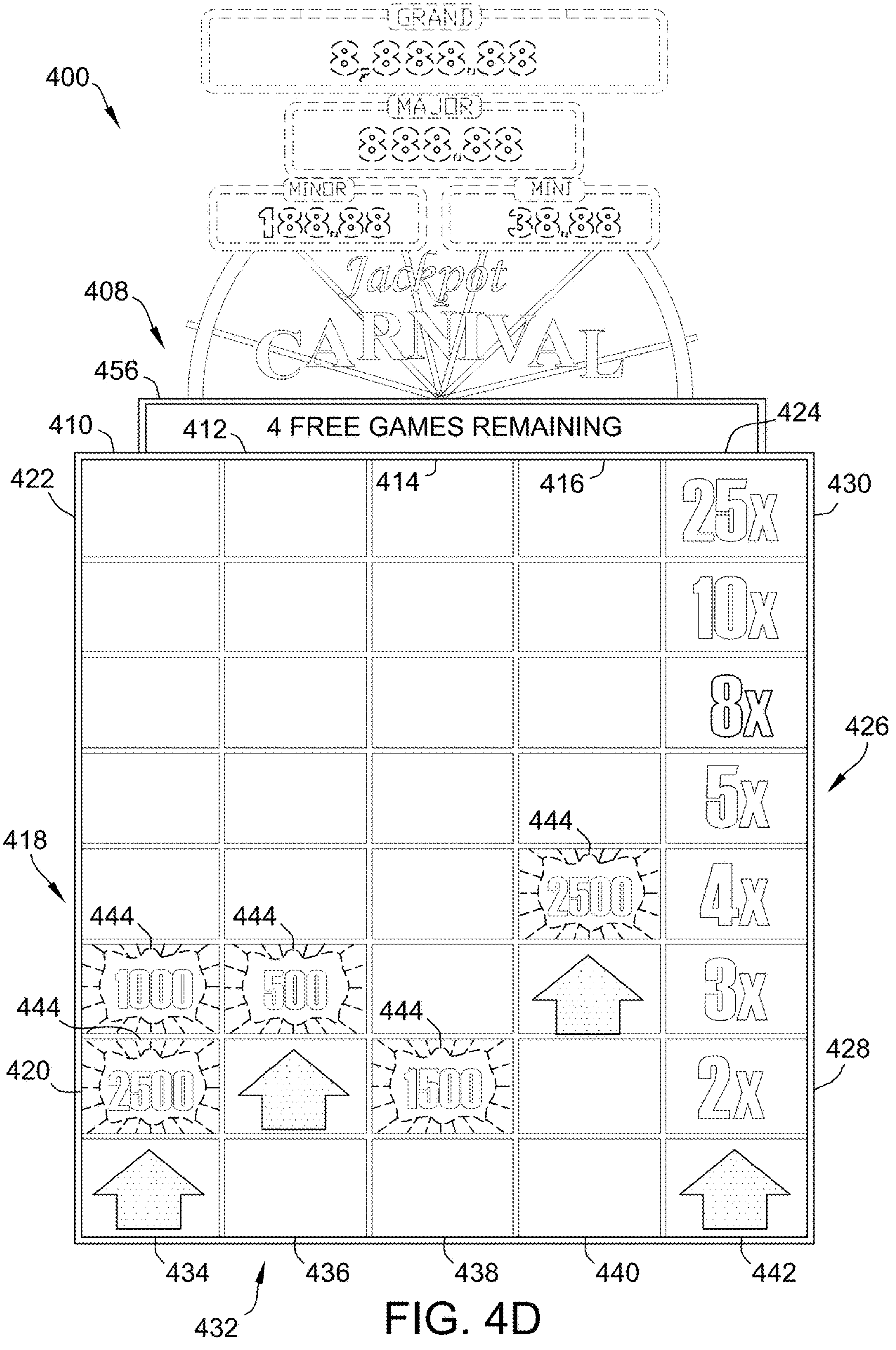
FIG. 4D is another example user interface of the game feature shown in FIGS. 4A, 4B, and 4C.

As shown in FIG. 4A, in response to the RNG call, one or more ladder incrementing symbols 446 may be displayed. Specifically, ladder incrementing symbols 446 are shown displayed by first reel 434 and fourth reel 440, which correspond respectively to first ladder 410 and fourth ladder 416. Ladder incrementing symbols 446 may also be displayed by second reel 436 and/or third reel 438. As shown in FIG. 4B, in response to ladder incrementing symbols 446 being displayed in corresponding reels 432 the ladder symbols 444 in first ladder 410 and fourth ladder 416 are incremented from first ladder position 420 to the next ladder position 418, which corresponds to a higher multiplier ladder position 426, and corresponding multiplier (e.g., the 2× multiplier), in multiplier ladder 424. Gaming device 104 and/or gaming system server 106 may accordingly update (e.g., increment) the corresponding records in the memory, for example, for the moved ladder symbols 444 of first ladder 410 and fourth ladder 416. Similarly, ladder incrementing symbols 446 are shown in FIG. 4C displayed in second reel 436 and fourth reel 440, which correspond respectively to second ladder 412 and fourth ladder 416. As shown in FIG. 4D, in response to ladder incrementing symbols 446 being displayed in corresponding reels 432 the ladder symbols 444 in second ladder 412 and fourth ladder 416 are incremented to the next ladder position 418, which corresponds to a higher multiplier ladder position 426, and corresponding multiplier, in multiplier ladder 424, and the corresponding records may be updated in the memory.

As shown in FIGS. 4A and 4C, in response to the RNG call, one or more credit symbols 448 may be displayed. Specifically, credit symbols 448 are shown displayed by third reel 438 in FIG. 4A and first reel 434 in FIG. 4C. credit symbols 448 may also be displayed by second reel 436 and/or fourth reel 440. Similar to ladder symbols 444, credit symbols 448 include a value (sometimes referred to herein as a "credit symbol value"). An effect of credit symbols 448 being displayed in a particular reel 432 may depend on a current status (e.g., position) of the corresponding ladder 408. For example, as shown in FIG. 4A, a ladder symbol 444 may be present in the first ladder position 420, in which case a value indicated by the credit symbol may be added to the value indicated by the ladder symbols 444 to increase the value, for example, adding 400 indicated by credit symbol 448 to 1000 indicated by ladder symbol 444 to generate a ladder symbol 444 having a value of 1400, as shown in FIG. 4B. As shown in FIG. 4C, a ladder symbol 444 may be displayed in a higher ladder position 418 (i.e., a ladder position 418 other than first ladder position 420) when a credit symbol 448 appears in the corresponding reel (e.g., first reel 434 in FIG. 4C). In this case, as shown in FIG. 4D, a new ladder symbol 446 may be generated in the corresponding first ladder position 120 (e.g., first ladder position 420 of first reel 434 shown in FIG. 4D. A new record (e.g., pointer) may be generated in the memory to define and/or record the newly generated ladder symbol 444.

As shown in FIG. 4A, in response to the RNG call, a spin credit symbol 450 may be displayed by fifth reel 442. When spin credit symbol 450 is displayed, the number of spin credits stored in the memory may be incremented (e.g., by one) to increase the length of the bonus feature. In some embodiments, the number of remaining spin credits is displayed by a spin credit indicator 456.

As shown in FIG. 4C, in response to the RNG call, multiplier enhancing symbols 452 may be displayed by fifth reel 442. When spin credit symbol 450 is displayed, a value of one or more of the multipliers displayed in multiplier ladder 424. For example, as shown in FIGS. 4C and 4D, the values of one or more of the multipliers displayed in multiplier ladder 424 may be increased from 1×, 2×, 3×, 4×, 5×, 8×, and 10× respectively to 2×, 3×, 4×, 5×, 8×, 10×, and 25×. The new multiplier values may be predefined in the memory, for example, as a table specifying the initial multiplier values and the multiplier values corresponding to each upgrade. Alternatively, the new multiplier values may be determined by a mathematical function (e.g., adding, for example, lx to the previous multiplier value). In some embodiments, the multiplier values may not exceed a maximum value (e.g., 25×).

In some embodiments, when particular reel symbol is displayed on a particular reel 432, the lookup table corresponding to that reel 432 may be modified to "remove" the symbol from the reel. In other words, the lookup table may be modified so that the RNG call outcome that resulted in displaying the reel symbol will result in a different symbol, such as blank space 454, in future spins. For example, in some embodiments, each reel 432 may initially have seven ladder incrementing symbols 446 (e.g., RNG outcomes specified by the corresponding lookup table that result in a display of ladder incrementing symbols 446). When one such ladder incrementing symbols 446 is displayed, that ladder incrementing symbol 446 may be removed from the reel 432, so that six ladder incrementing symbol 446 remain. This has the dual effect of reducing a likelihood that a ladder incrementing symbol 446 will be displayed after each time a ladder incrementing symbol 446 is displayed, and limiting the possible number of a ladder incrementing symbols 446 that can be displayed for a particular ladder 408 to seven. Similarly, credit symbols 448 may be removed, so limit the cash value that can be added to a particular ladder 408. Likewise, spin credit symbols 450 and/or multiplier enhancing symbols 452 may be removed, for example, to limit the number of spins for a game and/or to limit the multiplier ladder 424, respectively.

When no spins credits remain, gaming device 104 and/or gaming system server 106 may calculate an amount to award to a player credit balance. The credit values displayed in each ladder position 418 may be multiplied by the currently displayed multiplier value in multiplier ladder position 426 (e.g., the multiplier ladder position 426 in the same row), and the resulting values may be summed to determine the amount to award.

Figure 5:
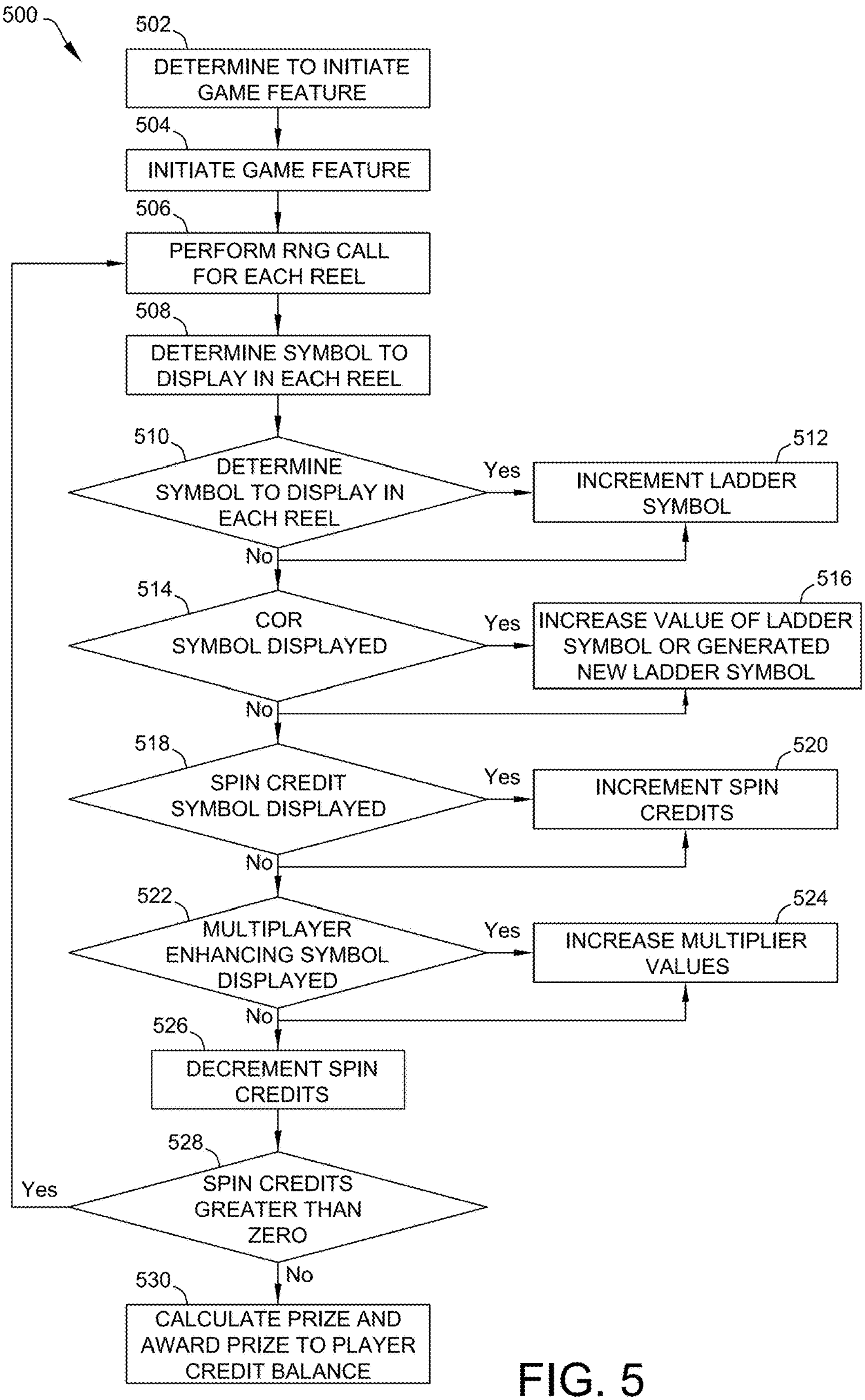
FIG. 5 is a flow diagram of an example embodiment of game feature having a two-dimensional multiplier ladder-.

FIG. 5 is a flowchart of an example process 500 for independently controlling portions of a display. In the example embodiment, process 500 may include determining 502 to initiate the display. In some embodiments, this determination is based on an outcome of a base game (e.g., at one of gaming devices 104 and/or mobile gaming devices 256)). For example, the base game may be a slot-style game in which one or more symbols may be displayed in response to a game instance, or "spin." The display may be initiated in response to certain outcomes of the based game, such as a certain combination of symbols being displayed. For example, in some embodiments, one or more credit elements (e.g., reel symbols), which include an indicator of some credit value, may be displayed during the base game. Further, one or more special symbols, referred to herein as "feature initiating symbols," may be displayed during the base game. In such embodiments, the display may be initiated in response to a winning combination of credit symbols being displayed during the base game (e.g., at least one credit symbol is displayed by each reel), in additional to the feature initiating symbol being displayed.

In the example embodiment, process 500 further includes initializing 504 the display. Initializing 504 the display may include displaying (e.g., on one of gaming devices 104 and/or mobile gaming devices 256) one or more ladders 408 (shown in FIGS. 4A-4D), which may be segmented elements of a certain length (e.g., number of segments, or ladder positions 418) that may indicate progress from one end of the ladder (e.g., first ladder position 420) to another (e.g., top ladder position 422). In some embodiments, each of the one or more ladders 408 may correspond to one of the reels displayed in the base game. Each of the one or more ladders 408 includes a plurality of ladder positions 418, in which one of ladder symbols 444 may be displayed. The ladder symbols 444 may be "persistent," in that they may remain displayed through multiple game instances, and location of each ladder symbol 444 may be recorded in the memory (e.g., memory 208). As described in further detail below, the records may be updated during the bonus feature (e.g., in response to certain reel symbols appearing), enabling the ladder symbols 444 to be "moved" to different ladder positions 446 in the display. In some embodiments, the ladder symbols 444 may, like the credit symbols displayed in the base game, include a credit value. In some embodiments, credit symbols that are displayed in the base game when the display is initiated may be "carried over" into the display, such that the ladder symbols 444 that are displayed in each ladder include the same value as the credit symbols displayed in corresponding reels of the base game.

Each of the ladder positions 418 may correspond to a value (e.g., a multiplier and/or another prize), with the ladder positions 418 corresponding to progressively increasing values. For example, a lowest value (e.g., ×1 multiplier) may correspond to first ladder position 420, and a highest value (e.g., ×10 multiplier) may correspond to a top ladder position 422, with progressively increasing values therebetween. These values may be displayed, for example, on a separate ladder (multiplier ladder 424) adjacent to ladders 408. Multiplier ladder 424 may include a multiplier ladder position 426 for each row of ladder positions, and may display the corresponding multiplier. The multiplier values displayed at the initialization of the display may be predefined, and as described in further detail below, may be altered (e.g., upgraded, or "boosted") during the display (e.g., in response to certain symbols being displayed). In some alternative embodiments, rather than multiplier values, the different ladder positions 418 may correspond to different prizes, jackpots, and/or other awards.

Initializing the display may further include displaying reels 432 (shown in FIGS. 4A-4D), each of which may be configured to display one or more symbols (e.g., ladder incrementing symbols 446 (shown in FIGS. 4A and 4C as a hammer symbol), credit symbols 448 (shown in FIGS. 4A and 4C), spin credit symbols 450 (shown in FIG. 4A), multiplier enhancing symbols 452 (shown in FIG. 4C as a "boost" symbol), and/or blank spaces 454 (shown in FIGS. 4A and 5C)) in response to a game instance, or "spin." Each of reels 432 may be associated with a different lookup table, which may associate different potential RNG call outcomes with symbols that may be displayed. Accordingly, as described below, when a separate RNG call is performed for each reel 432, a symbol to display for each reel 432 may be determined based on the RNG call and the lookup table for that reel 432.

Initializing the display may further include determining a number of spin credits. The number of spin credits may be decremented after each game instance, and an award may be determined when no spin credits remain. The initial number of spin credits may be a predefined number (e.g., five spin credits), or may be determined, for example, from a range at random and/or based on an outcome of the base game. The number of spin credits may be displayed to the user.

In the example embodiment, process 500 may include performing 506 an RNG call (e.g., using RNG 212) for each reel 432, and determining 508 a symbol to display for each reel 432 based on an outcome of the RNG call and the lookup table associated with the reel 432. For example, the RNG call outcome may be compared to the lookup table to identify a symbol that corresponds to the RNG call outcome. The determined symbols may be displayed in the corresponding reels 432.

In the example embodiment, process 500 may further include determining 510 if a ladder incrementing symbols 446 is displayed in any of reels 432. If a ladder incrementing symbol 446 is displayed, process 500 may further include incrementing 512 any ladder symbol 444 displayed in a ladder 408 where ladder incrementing symbol 446 is displayed in a corresponding reel 432 (e.g., by updating the display and corresponding record in the memory). In some embodiments, once a ladder incrementing symbols 446 is displayed, the lookup table of the corresponding reel 432 is updated to replace the ladder incrementing symbols 446 with another symbol (e.g., a blank space 454), so that if the same RNG call outcome occurs in the future for that reel 432, a blank space 454 will be displayed rather than a ladder incrementing symbols 446. Accordingly, the number of ladder incrementing symbols 446 that are displayed may be limited, which may in turn limit the prize ultimately awarded to the user and/or prevent the ladder symbols 444 from being incremented past top ladder position 422.

In the example embodiment, process 500 may further include determining 514 if a credit symbol 448 is displayed in any of reels 432. If a ladder incrementing symbol 446 is displayed, process 500 may further include, if a ladder symbol 444 is displayed in first ladder position 420, increasing 516 the value of the ladder symbol 444 (e.g., by adding the value of the displayed credit symbol 448), or if no ladder symbol 444 is currently displayed in first ladder position 420, generating and displaying a new ladder symbol 444 in the corresponding first ladder position 4, so that the corresponding ladder 408 may include multiple ladder symbols 444 corresponding to different respective ladder positions 418 and multipliers. In some embodiments, once a credit symbol 448 is displayed, the lookup table of the corresponding reel 432 is updated to replace the ladder credit symbol 448 with another symbol (e.g., a blank space 454), so that if the same RNG call outcome occurs in the future for that reel 432, a blank space 454 will be displayed rather than a credit symbol 448. Accordingly, the number of credit symbols 448 that are displayed may be limited, which may in turn limit the prize ultimately awarded to the user.

In the example embodiment, process 500 may further include determining 518 if a spin credit symbol 450 is displayed in any of reels 432 (e.g., fifth reel 442). If a spin credit symbol 450 is displayed, process 500 may further include incrementing 520 the number of spin credits, which may result in a greater number of game instances with potentially greater prizes for the user. In some embodiments, once a spin credit symbol 450 is displayed, the lookup table of the corresponding reel 432 is updated to replace the ladder spin credit symbol 450 with another symbol (e.g., a blank space 454), so that if the same RNG call outcome occurs in the future for that reel 432, a blank space 454 will be displayed rather than a spin credit symbol 450. Accordingly, the number of spin credit symbols 450 that are displayed may be limited, which may in turn limit a length of the game. In some embodiments, the number of remaining spin credits is displayed by a spin credit indicator 456.

In the example embodiment, process 500 may further include determining 522 if any multiplier enhancing symbol 452 is displayed in any of reels 432 (e.g., fifth reel 442). If a multiplier enhancing symbol 452 is displayed process 500 may further include increasing 524 the multiplier values of each multiplier ladder 426, for example, by retrieving anew set of multiplier values from a table and/or performing a mathematical function on the currently displayed multiplier values. In some embodiments, a maximum multiplier value (e.g., 25×) may not be exceeded by any of the displayed multiplier values (e.g., to comply with regulatory requirements). In some embodiments, once a multiplier enhancing symbol 452 is displayed, the lookup table of the corresponding reel 432 is updated to replace the multiplier enhancing symbol 452 with another symbol (e.g., a blank space 454), so that if the same RNG call outcome occurs in the future for that reel 432, a blank space 454 will be displayed rather than a multiplier enhancing symbol 452. Accordingly, the number of multiplier enhancing symbols 452 that are displayed may be limited, which may in turn limit the prize ultimately awarded to the user.

In the example embodiment process 500 may further include decrementing 526 the number of spin credits and determining 528 if any spin credits remain. If spin credits remain, another spin may be performed. If not spin credits remain, process 500 may further include calculating 530 a prize and crediting the prize to a player credit balance. For example, the credit values of any ladder symbols 444 currently displayed may be multiplied by the multiplier corresponding to their current ladder position 418 (e.g., the multiplier displayed in the multiplier ladder position 426 in the same row), and the resulting amounts may be summed in order to determine the prize. Once the prize has been awarded to the user, the base game associated with the display (if any) may resume.

Figure 6:
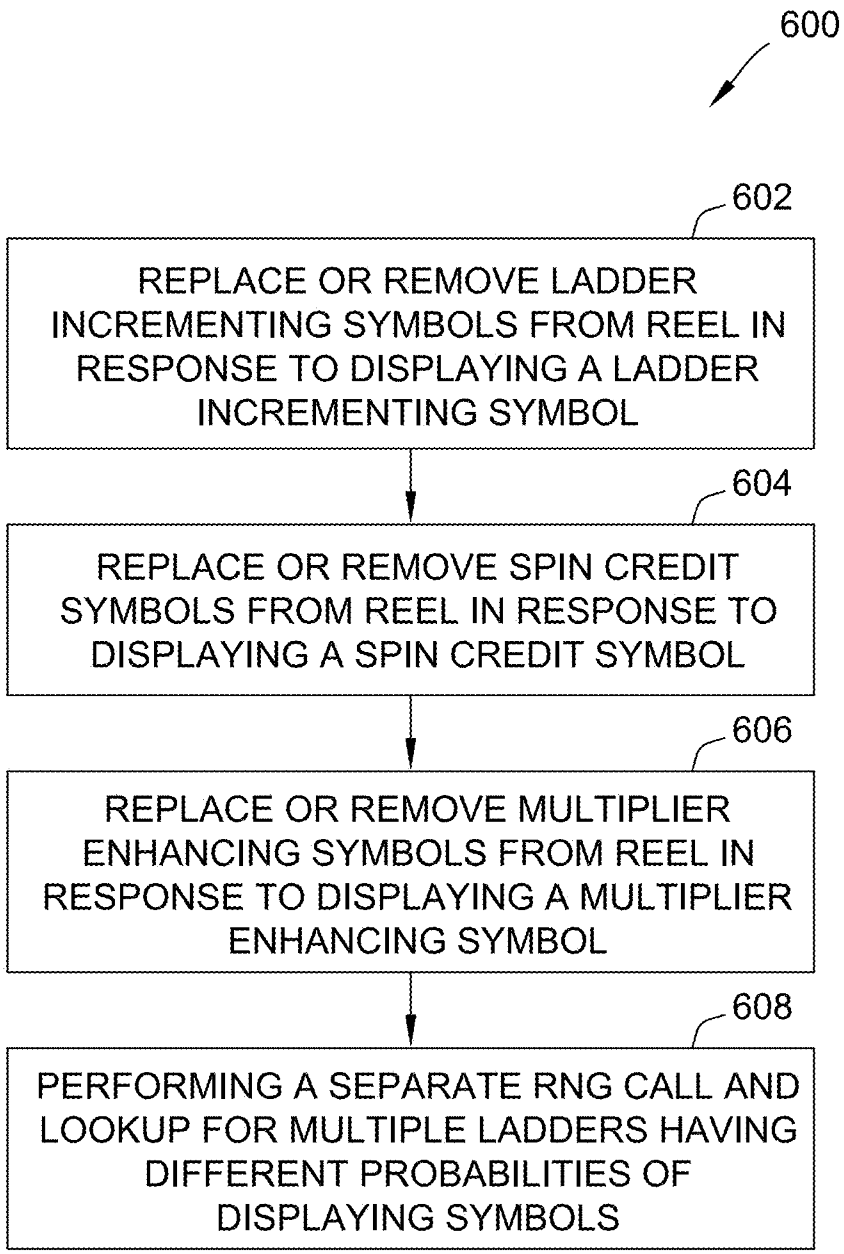
FIG. 6 is a flow diagram of an example process for achieving a target RTP and/or game volatility.

FIG. 6 is a flowchart of an example process 600 for achieving a target RTP and/or game volatility. Process 600 may include replacing or removing 602 ladder incrementing symbols 446 from reel 432 in response to ladder incrementing symbol 446 being displayed. The reel strip position assigned with the ladder incrementing symbol 446 is updated/replaced with a blank symbol 454 or some other symbol type.

Process 600 may further include replacing or removing 604 spin credit symbol 450 from reel 432 (e.g., by modifying the lookup table associated with the reel as described above) in response to spin credit symbol 450 being displayed.

Process 600 may further include replacing or removing 606 multiplier enhancing symbol 452 from reel 432 (e.g., by modifying the lookup table associated with re reel as described above) in response to multiplier enhancing symbol 432 being displayed.

Process 600 may further include performing a separate RNG call and lookup for multiple ladders 408. To control game volatility, reels 434-440 could have different probabilities of displaying ladder incrementing symbols 446.

In one aspect, a system for independently controlling portions of a game display is provided. The system may include a display device and a processor. The processor may be configured to execute instructions stored in a memory device, which when executed, cause the processor to control the display device to present an array of display positions including columns and rows of display positions, the array including a first row having a reel of symbols associated with each column of the first row for displaying symbols on the reels within the first row, the array including a second row for displaying a set of initial symbols, each row of the array above the first row including a progressively increasing multiplier value, identify an RNG output for each of the reels, perform a first lookup within a first table associated with a first column using the RNG output for the first column, determine that a step-up symbol should be displayed in the first column based on the first lookup, move the initial symbol displayed in the first column up at least one row based on the determination that the step-up symbol should be displayed, and/or credit an award to a player credit balance, the award computed based the multiplier values of the rows in which the initial symbols are currently displayed.

In some embodiments, the processor may be further configured to, in response to the determination that a step-up symbol should be displayed in the first row, modify the first table so that the step-up symbol is not displayed in response to subsequent lookups using the first table associated with the same RNG output.

In some embodiments, the processor may be further configured to perform a second lookup within a second table associated with a second column using the RNG output for the second column.

In some embodiments, the processor may be further configured to, in response to the determination that a step-up symbol should be displayed in the second row, modify the second table so that the step-up symbol is not displayed in response to subsequent lookups using the second table associated with the same RNG output.

In some embodiments, the processor may be further configured to determine that a step-up symbol should be displayed in the first column based on the second lookup and/or move the initial symbol displayed in the second column up at least one row based on the determination that the step-up symbol should be displayed.

In some embodiments, the initial symbols include credit values, and wherein the award is computed further based on the credit values.

In some embodiments, the processor may be further configured to determine that a credit symbol should be displayed in the first column based on the second lookup and/or increase the credit value of the initial symbol displayed in the second column based on the determination that the credit symbol should be displayed.

In some embodiments, the processor may be further configured to determine that a spin credit symbol should be displayed in the first column based on the second lookup and/or increment a current number of spin credits based on the determination that the spin credit symbol should be displayed.

In some embodiments, the processor may be further configured to determine that multiplier enhancing symbol should be displayed in the first column based on the second lookup and/or increase the values of the multipliers of each row above the first row based on the determination that the multiplier enhancing symbol should be displayed.

In another aspect, a method for independently controlling portions of a game display is provided. The method may include providing content configured to cause a display device to present an array of display positions including columns and rows of display positions, the array including a first row having a reel of symbols associated with each column of the first row for displaying symbols on the reels within the first row, the array including a second row for displaying a set of initial symbols, each row of the array above the first row including a progressively increasing multiplier value, generating an RNG output for each of the reels, performing a first lookup within a first table associated with a first column using the RNG output for the first column, determining that a step-up symbol should be displayed in the first column based on the first lookup, providing instructions configured to cause the display device to move the initial symbol displayed in the first column up at least one row based on the determination that the step-up symbol should be displayed, and/or crediting an award to a player credit balance, the award computed based the multiplier values of the rows in which the initial symbols are currently displayed.

In some embodiments, the method may further include, in response to the determination that a step-up symbol should be displayed in the first row, modifying the first table so that the step-up symbol is not displayed in response to subsequent lookups using the first table associated with the same RNG output.

In some embodiments, the method may further include performing a second lookup within a second table associated with a second column using the RNG output for the second column.

In some embodiments, the method may further include, in response to the determination that a step-up symbol should be displayed in the second row, modifying the second table so that the step-up symbol is not displayed in response to subsequent lookups using the second table associated with the same RNG output.

In some embodiments, the method may further include determining that a step-up symbol should be displayed in the first column based on the second lookup and/or providing instructions configured to cause the display device to move the initial symbol displayed in the second column up at least one row based on the determination that the step-up symbol should be displayed.

In some embodiments, the initial symbols include credit values, and wherein the award is computed further based on the credit values.

In some embodiments, the method may further include determining that a credit symbol should be displayed in the first column based on the second lookup and/or increasing the credit value of the initial symbol displayed in the second column based on the determination that the credit symbol should be displayed.

In some embodiments, the method may further include determining that a spin credit symbol should be displayed in the first column based on the second lookup and/or incrementing a current number of spin credits based on the determination that the spin credit symbol should be displayed.

In some embodiments, the method may further include determining that multiplier enhancing symbol should be displayed in the first column based on the second lookup and/or increasing the values of the multipliers of each row above the first row based on the determination that the multiplier enhancing symbol should be displayed.

In another aspect, at least one non-transitory computer-readable media having computer-executable instructions embodied thereon is provide. When executed by a processor, the computer-executable instructions may cause the processor to provide content configured to cause a display device to present an array of display positions including columns and rows of display positions, the array including a first row having a reel of symbols associated with each column of the first row for displaying symbols on the reels within the first row, the array including a second row for displaying a set of initial symbols, each row of the array above the first row including a progressively increasing multiplier value, retrieve an RNG output for each of the reels, perform a first lookup within a first table associated with a first column using the RNG output for the first column, determine that a step-up symbol should be displayed in the first column based on the first lookup, provide instructions configured to cause the display device to move the initial symbol displayed in the first column up at least one row based on the determination that the step-up symbol should be displayed, and/or credit an award to a player credit balance, the award computed based the multiplier values of the rows in which the initial symbols are currently displayed.

In some embodiments, the computer-executable instructions may further cause the processor to perform a second lookup within a second table associated with a second column using the RNG output for the second column, determine that a step-up symbol should be displayed in the first column based on the second lookup, and/or provide instructions configured to cause the display device to move the initial symbol displayed in the second column up at least one row based on the determination that the step-up symbol should be displayed.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for independently controlling portions of a game display, the system comprising a display device and a processor, the processor configured to execute instructions stored in a memory device, which when executed, cause the processor to:

control the display device to present an array of display positions including columns and rows of display positions, the array including a first row having a reel of symbols associated with each column of the first row for displaying symbols on the reels within the first row, the array including a second row for displaying a set of initial symbols, each row of the array above the first row including a progressively increasing multiplier value;

identify an RNG output for each of the reels;

perform a first lookup within a first table associated with a first column using the RNG output for the first column;

determine that a step-up symbol should be displayed in the first column based on the first lookup;

move the initial symbol displayed in the first column up at least one row based on the determination that the step-up symbol should be displayed; and credit an award to a player credit balance, the award computed based the multiplier values of the rows in which the initial symbols are currently displayed.

2. The gaming system of claim 1, wherein the processor is further configured to, in response to the determination that a step-up symbol should be displayed in the first row, modify the first table so that the step-up symbol is not displayed in response to subsequent lookups using the first table associated with the same RNG output.

3. The system of claim 1, wherein the processor is further configured to perform a second lookup within a second table associated with a second column using the RNG output for the second column.

4. The gaming system of claim 3, wherein the processor is further configured to, in response to the determination that a step-up symbol should be displayed in the second row, modify the second table so that the step-up symbol is not displayed in response to subsequent lookups using the second table associated with the same RNG output.

5. The system of claim 3, wherein the processor is further configured to:

determine that a step-up symbol should be displayed in the first column based on the second lookup; and move the initial symbol displayed in the second column up at least one row based on the determination that the step-up symbol should be displayed.

6. The gaming system of claim 3, wherein the initial symbols include credit values, and wherein the award is computed further based on the credit values.

7. The system of claim 6, wherein the processor is further configured to:

determine that a credit symbol should be displayed in the first column based on the second lookup; and increase the credit value of the initial symbol displayed in the second column based on the determination that the credit symbol should be displayed.

8. The system of claim 3, wherein the processor is further configured to:

determine that a spin credit symbol should be displayed in the first column based on the second lookup; and increment a current number of spin credits based on the determination that the spin credit symbol should be displayed.

9. The system of claim 3, wherein the processor is further configured to:

determine that multiplier enhancing symbol should be displayed in the first column based on the second lookup; and increase the values of the multipliers of each row above the first row based on the determination that the multiplier enhancing symbol should be displayed.

10. A method for independently controlling portions of a game display, the method comprising:

providing content configured to cause a display device to present an array of display positions including columns and rows of display positions, the array including a first row having a reel of symbols associated with each column of the first row for displaying symbols on the reels within the first row, the array including a second row for displaying a set of initial symbols, each row of the array above the first row including a progressively increasing multiplier value;

generating an RNG output for each of the reels;

performing a first lookup within a first table associated with a first column using the RNG output for the first column;

determining that a step-up symbol should be displayed in the first column based on the first lookup;

providing instructions configured to cause the display device to move the initial symbol displayed in the first column up at least one row based on the determination that the step-up symbol should be displayed; and crediting an award to a player credit balance, the award computed based the multiplier values of the rows in which the initial symbols are currently displayed.

11. The method of claim 10, further comprising, in response to the determination that a step-up symbol should be displayed in the first row, modifying the first table so that the step-up symbol is not displayed in response to subsequent lookups using the first table associated with the same RNG output.

12. The method of claim 10, further comprising performing a second lookup within a second table associated with a second column using the RNG output for the second column.

13. The method of claim 12, further comprising, in response to the determination that a step-up symbol should be displayed in the second row, modifying the second table so that the step-up symbol is not displayed in response to subsequent lookups using the second table associated with the same RNG output.

14. The method of claim 12, further comprising:

determining that a step-up symbol should be displayed in the first column based on the second lookup; and providing instructions configured to cause the display device to move the initial symbol displayed in the second column up at least one row based on the determination that the step-up symbol should be displayed.

15. The method of claim 12, wherein the initial symbols include credit values, and wherein the award is computed further based on the credit values.

16. The method of claim 15, further comprising:

determining that a credit symbol should be displayed in the first column based on the second lookup; and increasing the credit value of the initial symbol displayed in the second column based on the determination that the credit symbol should be displayed.

17. The method of claim 12, further comprising:

determining that a spin credit symbol should be displayed in the first column based on the second lookup; and incrementing a current number of spin credits based on the determination that the spin credit symbol should be displayed.

18. The method of claim 12, further comprising:

determining that multiplier enhancing symbol should be displayed in the first column based on the second lookup; and increasing the values of the multipliers of each row above the first row based on the determination that the multiplier enhancing symbol should be displayed.

19. At least one non-transitory computer-readable media having computer-executable instructions embodied thereon, wherein when executed by a processor, the computer-executable instructions cause the processor to:

provide content configured to cause a display device to present an array of display positions including columns and rows of display positions, the array including a first row having a reel of symbols associated with each column of the first row for displaying symbols on the reels within the first row, the array including a second row for displaying a set of initial symbols, each row of the array above the first row including a progressively increasing multiplier value;

retrieve an RNG output for each of the reels;

perform a first lookup within a first table associated with a first column using the RNG output for the first column;

determine that a step-up symbol should be displayed in the first column based on the first lookup;

provide instructions configured to cause the display device to move the initial symbol displayed in the first column up at least one row based on the determination that the step-up symbol should be displayed; and credit an award to a player credit balance, the award computed based the multiplier values of the rows in which the initial symbols are currently displayed.

20. The at least one non-transitory computer-readable media of claim 19, wherein the instructions further cause the processor to:

perform a second lookup within a second table associated with a second column using the RNG output for the second column;

determine that a step-up symbol should be displayed in the first column based on the second lookup; and provide instructions configured to cause the display device to move the initial symbol displayed in the second column up at least one row based on the determination that the step-up symbol should be displayed.

* * * * *